(12) United States Patent
Vobbilisetty (10) Patent No.: US 8,848,575 B2
(45) Date of Patent: Sep. 30, 2014

(54) HIGH AVAILABILITY AND MULTIPATHING FOR FIBRE CHANNEL OVER ETHERNET

(75) Inventor: Suresh Vobbilisetty, San Jose, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 1040 days.

(21) Appl. No.: 12/390,626

(22) Filed: Feb. 23, 2009

(65) Prior Publication Data

US 2010/0214950 A1 Aug. 26, 2010

(51) Int. Cl.
| H04L 12/28 | (2006.01) |
| H04L 12/751 | (2013.01) |
| H04L 12/755 | (2013.01) |
| H04L 12/931 | (2013.01) |
| H04L 12/939 | (2013.01) |
| H04L 29/08 | (2006.01) |
| H04L 12/70 | (2013.01) |

(52) U.S. Cl.
CPC ......... *H04L 45/02* (2013.01); *H04L 2012/5605* (2013.01); *H04L 45/021* (2013.01); *H04L 49/357* (2013.01); *H04L 49/557* (2013.01); *H04L 49/70* (2013.01); *H04L 67/1097* (2013.01)
USPC ............................ 370/254; 370/389; 370/390

(58) Field of Classification Search
CPC ....................... H04L 2012/5605; H04L 49/357
USPC .......................................... 370/216–248, 254
See application file for complete search history.

(56) References Cited

U.S. PATENT DOCUMENTS

| 4,922,486 A | 5/1990 | Lidinsky et al. |
| 5,090,011 A | 2/1992 | Fukuta et al. |
| 5,115,433 A | 5/1992 | Baran et al. |
| 5,251,205 A | 10/1993 | Callon et al. |
| 5,274,631 A | 12/1993 | Bhardwaj |
| 5,305,311 A | 4/1994 | Lyles |

(Continued)

FOREIGN PATENT DOCUMENTS

WO 9836537 A1 8/1998

OTHER PUBLICATIONS

Michael D. Schroeder et al., Autonet: a High-speed, Self-configuring Local Area Network Using Point-to-point Links, Digital Equipment Corporation, SRC Research Report 59, Apr. 21, 1990, 44 pages.

(Continued)

*Primary Examiner* — Brandon Renner
(74) *Attorney, Agent, or Firm* — Wong, Cabello, Lutsch, Rutherford & Brucculeri, L.L.P.

(57) ABSTRACT

A physical Fiber Channel over Ethernet (FCoE) switch defines a multipath virtual FCoE switch to provide uninterrupted storage access between N_PORTs of an FCoE host and a Fiber Channel (FC) storage target, for example, in response to an F_PORT failure. Through the multipath virtual FCoE switch, the fabric is configured with multiple physical paths available between the FCoE hosts and FC targets. The multipath virtual FCoE switch is defined between or among multiple physical FCoE switches coupled to the Ethernet fabric. One of the F_PORTs is designated as being in the primary FCoE path, while any other F_PORTs sharing the virtual FCoE switch are reserved for standby paths in case the primary FCoE path is disabled. When a failure to a primary FCoE path is detected, a standby path is promoted to become a new primary FCoE path and subsequent traffic is routed in both directions through the new primary FCoE path.

20 Claims, 6 Drawing Sheets

(56) References Cited

U.S. PATENT DOCUMENTS

| | | | |
|---|---|---|---|
| 5,390,173 | A | 2/1995 | Spinney et al. |
| 5,805,805 | A | 9/1998 | Civanlar et al. |
| 5,894,481 | A | 4/1999 | Book |
| 5,905,873 | A | 5/1999 | Hartmann et al. |
| 5,996,024 | A | 11/1999 | Blumenau |
| 6,000,020 | A | 12/1999 | Chin et al. |
| 6,021,454 | A | 2/2000 | Gibson |
| 6,085,238 | A | 7/2000 | Yuasa et al. |
| 6,147,969 | A | 11/2000 | Benmohamed et al. |
| 6,278,532 | B1 | 8/2001 | Heimendinger et al. |
| 6,400,730 | B1 | 6/2002 | Latif et al. |
| 6,594,234 | B1 | 7/2003 | Chard et al. |
| 6,657,962 | B1 | 12/2003 | Barri et al. |
| 6,690,668 | B1 | 2/2004 | Szczepanek et al. |
| 6,738,821 | B1 | 5/2004 | Wilson et al. |
| 6,742,090 | B2 | 5/2004 | Sanada et al. |
| 6,763,417 | B2 | 7/2004 | Paul et al. |
| 7,027,450 | B2 | 4/2006 | Collette et al. |
| 7,072,298 | B2 | 7/2006 | Paul et al. |
| 7,088,735 | B1 | 8/2006 | Reohr, Jr. et al. |
| 7,120,728 | B2 | 10/2006 | Krakirian et al. |
| 7,130,303 | B2 | 10/2006 | Hadzic |
| 7,133,416 | B1 | 11/2006 | Chamdani et al. |
| 7,145,914 | B2 | 12/2006 | Olarig et al. |
| 7,194,550 | B1 | 3/2007 | Chamdani et al. |
| 7,197,047 | B2 | 3/2007 | Latif et al. |
| 7,206,314 | B2 | 4/2007 | Liao et al. |
| 7,218,636 | B2 | 5/2007 | Paul et al. |
| 7,236,496 | B2 | 6/2007 | Chung et al. |
| 7,237,045 | B2 | 6/2007 | Beckmann et al. |
| 7,269,168 | B2 | 9/2007 | Roy et al. |
| 7,308,001 | B2 | 12/2007 | Collette et al. |
| 7,376,765 | B2 | 5/2008 | Rangan et al. |
| 7,433,351 | B1 | 10/2008 | Pelissier et al. |
| 7,453,810 | B2 | 11/2008 | Zoranovic et al. |
| 7,466,712 | B2 | 12/2008 | Makishima et al. |
| 7,583,681 | B2 | 9/2009 | Green |
| 7,616,637 | B1 | 11/2009 | Lee et al. |
| 2002/0083285 | A1 | 6/2002 | Sanada et al. |
| 2003/0043742 | A1 | 3/2003 | De Maria et al. |
| 2003/0126297 | A1 | 7/2003 | Olarig et al. |
| 2003/0131105 | A1 | 7/2003 | Czeiger et al. |
| 2003/0202536 | A1 | 10/2003 | Foster et al. |
| 2004/0133570 | A1 | 7/2004 | Soltis |
| 2005/0007951 | A1 | 1/2005 | Lapuh et al. |
| 2005/0157752 | A1 | 7/2005 | Takase et al. |
| 2005/0249247 | A1 | 11/2005 | Shanley et al. |
| 2005/0286551 | A1 | 12/2005 | Berman |
| 2006/0005076 | A1 | 1/2006 | Brown et al. |
| 2006/0023726 | A1* | 2/2006 | Chung et al. ............... 370/398 |
| 2006/0098572 | A1 | 5/2006 | Zhang et al. |
| 2006/0098589 | A1 | 5/2006 | Kreeger |
| 2006/0098681 | A1 | 5/2006 | Cafiero |
| 2006/0101140 | A1 | 5/2006 | Gai |
| 2006/0168155 | A1 | 7/2006 | Pascasio et al. |
| 2006/0203725 | A1 | 9/2006 | Paul et al. |
| 2006/0206579 | A1 | 9/2006 | Connor et al. |
| 2006/0251067 | A1* | 11/2006 | DeSanti et al. ............... 370/389 |
| 2007/0201490 | A1 | 8/2007 | Mahamuni |
| 2007/0288653 | A1 | 12/2007 | Sargor et al. |
| 2008/0056246 | A1* | 3/2008 | McGee et al. ............... 370/389 |
| 2008/0159260 | A1* | 7/2008 | Vobbilisetty et al. ......... 370/351 |
| 2008/0205264 | A1* | 8/2008 | Rorie ............... 370/219 |
| 2008/0259920 | A1* | 10/2008 | Cheng et al. ............... 370/390 |
| 2009/0052461 | A1 | 2/2009 | Brown et al. |
| 2009/0132701 | A1* | 5/2009 | Snively ............... 709/224 |
| 2009/0245242 | A1* | 10/2009 | Carlson et al. ............... 370/386 |
| 2009/0245791 | A1* | 10/2009 | Thaler et al. ............... 398/45 |
| 2009/0254640 | A1* | 10/2009 | Otani ............... 709/221 |
| 2009/0268746 | A1 | 10/2009 | Ogasahara et al. |
| 2009/0287898 | A1* | 11/2009 | Hara ............... 711/170 |
| 2009/0303990 | A1* | 12/2009 | Ambrose et al. ............... 370/389 |
| 2010/0070722 | A1* | 3/2010 | Otani et al. ............... 711/162 |

OTHER PUBLICATIONS

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.

Cisco MDS 9000 Family of Multilayer Directors and Fabric Switches, at http://www.cisco.com/en/US/products/ps6446/prod_brochure0900aecd80355d56.html, 3 pages, © 1992-2005, printed Jul. 19, 2006.

Cisco MDS 9000 Family Networked Storage Solutions for Small and Medium-Sized Businesses—At-a-Glance, 2-page product brochure, © 1992-2005 Cisco Systems, Inc.

DStar: CNT Remains FICON Leader with UltraNet Multi-Service Director, at http://www.taborcommunications.com/dsstar/04/1109/109456.html, 2 pages, printed Jul. 19, 2006.

CD/9000 Channel Director—Product Detail by CNT, at http://web.archive.org/web/20050204044510/www.cnt.com/products/switching/cd9000, 2 pages, © 2003-2005, printed Jul. 19, 2006.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

McData—Intrepid® 6140 Director, product brochure, 2 pages, © 2006 McData Corporation.

McData—Intrepid® 10000 Director, product brochure, 2 pages, © 2006 McData Corporation.

Mogul, J. et al., "IP MTU Discovery Options," RFC 1063, Jul. 1998, 11 pages.

European Search Report prepared by the European Patent Office for EP Application No. 10 15 4286, dated May 28, 2010, 6 pages.

Lapuh, Roger et al., Split Multi-Link Trunking (SMLT) draft-lapuh-network-smlt-08, Internet Engineering Task Force, IETF; StandardWorkingDraft, Internet Society (ISOC) 4, Ru Des Falaises CH-1205, Geneva, Switzerland, No. 8, Jul. 7, 2008, XP015059390, 15 pages.

* cited by examiner

HIGH AVAILABILITY AND MULTIPATHING FOR FIBRE CHANNEL OVER ETHERNET

BACKGROUND

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices.

In a typical SAN, one or more FC switches are used to communicatively connect one or more server devices with one or more data storage devices. Such switches generally support a high performance switching fabric and provide a number of communication ports for connecting to other switches, servers, storage devices, or other SAN devices. Other high performance fabrics may employ different fabric technologies, such as Infiniband.

Other networking technologies, such as Ethernet, may also be employed in communicating between computing and networking devices. An evolving standard referred to as Fibre Channel over Ethernet (FCoE), for example, is modeled as a Layer3 protocol on top of a Convergence Enhanced Ethernet (CEE) fabric. A typical topology includes FCoE switches connected at a boundary between a Fibre Channel fabric and a CEE fabric. When deployed in such a multi-protocol fabric, an FCoE F_PORT is the primary interface for all storage traffic between an FCoE N_PORT (e.g., of an FCoE host) and an FC resident storage target. As such, failure (or disabling) of the FCoE F_PORT can significantly disrupt I/O between FCoE hosts in the CEE fabric and FC targets that are interconnected in the FC fabric. For example, in a typical configuration, an N_PORT of an FCoE host is required to initiate Link Keep Alive Extended Link Services (LKA ELS) between the FCoE N_PORT and the FCoE F_PORTs in the Fibre Channel fabric. When an FCoE F_PORT failure is detected, the FCoE N_PORT is required to initiate a new FLOGI, followed by a PLOGI to each FC target, to revive communications. Such disruptions in communications are undesirable, and the existing approach is not well scalable.

SUMMARY

Implementations described and claimed herein address the foregoing problems by using a multipath virtual FCoE switch to provide uninterrupted storage access between FCoE N_PORTs of an FCoE host and an FC storage target, for example, in the presence of an FCoE F_PORT failure. Through the multipath virtual FCoE switch, an FCoE fabric is configured with multiple physical paths available between the FCoE hosts and FC targets. Accordingly, a transparent path switchover among such paths may be effected when an active FCoE F_PORT fails, thereby preserving uninterrupted communications between the FCoE hosts and the FC storage targets.

In support of the described technology, a multipath virtual FCoE switch is defined between or among multiple physical FCoE switches coupled to the Ethernet fabric. On the multipath virtual FCoE switch, a virtual FCoE F_PORT is defined for each physical FCoE F_PORT coupled to the Ethernet fabric. The physical FCoE switches create the multipath virtual FCoE switch, which is assigned its own domain ID. The multipath virtual FCoE switch then forms a logical Inter Switch Link (ISL) with each FCoE switch interfacing with the CEE fabric. The ISLs create logical FSPF adjacencies between the multipath virtual FCoE switch and the physical FCoE switches, thereby advertising the reachability of the multipath virtual FCoE switch through at least two physical FCoE switches in the FCoE fabric.

More than two physical FCoE switches may be employed in this multipathing configuration. One of the FCoE F_PORTs on one of the physical FCoE switches is designated as being in the primary FCoE path, while any other F_PORTs sharing the multipath virtual FCoE switch are reserved for standby paths in case the primary FCoE path is disabled. When a failure to a primary FCoE path is detected (e.g., the primary physical FCoE switch, the primary physical FCoE F_PORT, or the physical link with the CEE fabric is disabled), one of the auxiliary paths is promoted to become a new primary FCoE path and subsequent traffic is routed in both directions through the new primary FCoE path, effectively maintaining uninterrupted communications in both directions between the FCoE hosts and the FC storage targets.

Other implementations are also described and recited herein.

DETAILED DESCRIPTION

Figure 1:
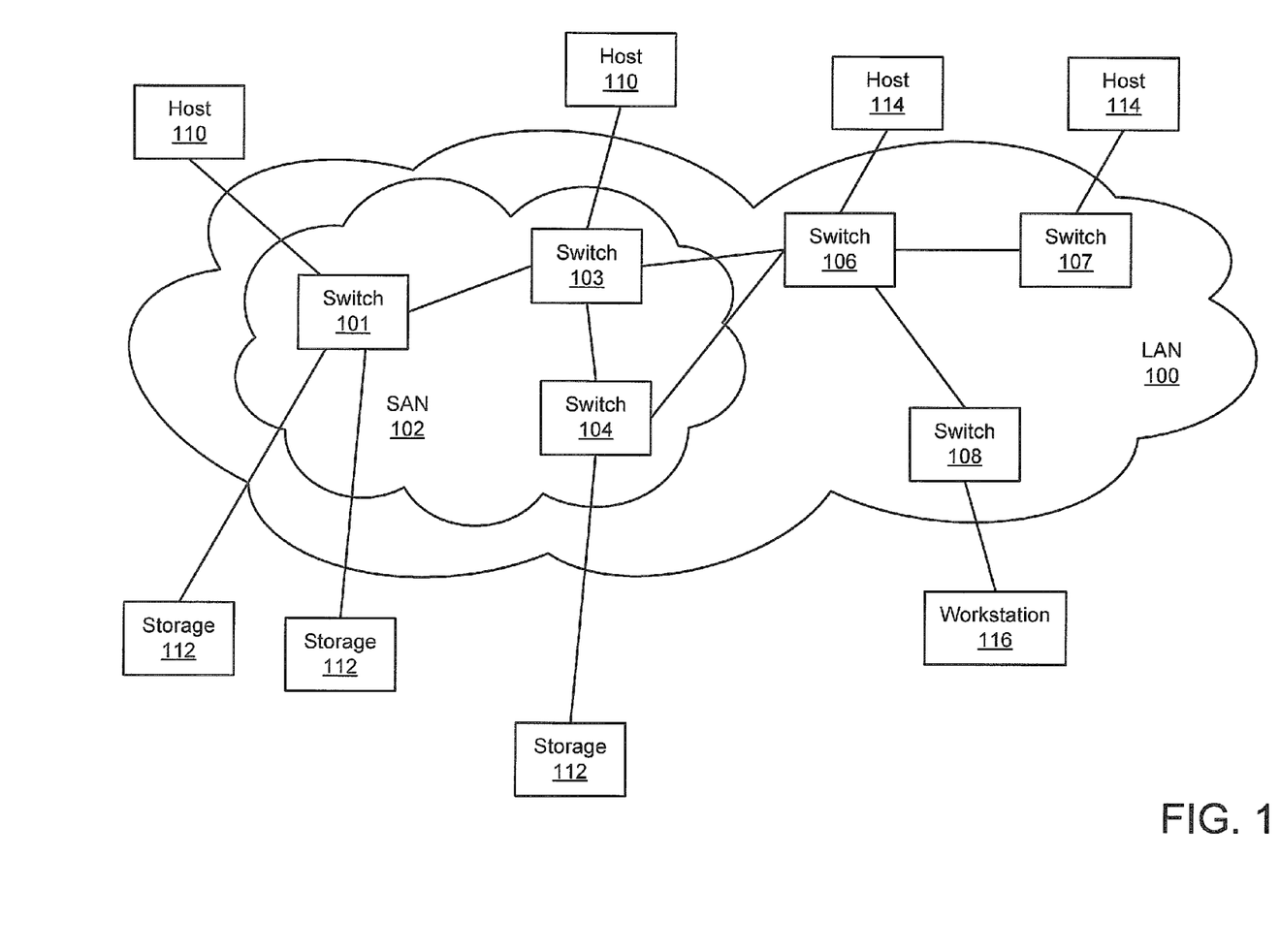
FIG. 1 illustrates an exemplary computing and storage framework including a local area network (LAN) and a storage area network (SAN).

FIG. 1 illustrates an exemplary computing and storage framework including a local area network (LAN) 100 and a storage area network (SAN) 102. A local area network (LAN) 100 provides communication connectivity among multiple devices, such as a workstation 116 and hosts 114. Connectivity within the LAN 100 is provided by switches 106, 107 and 108. The LAN 100 is presumed to be the network for a relevant enterprise with a number of different segments, although any LAN configuration may be employed.

A storage area network (SAN) 102 resides within the LAN 100 and provides communication connectivity, routing, and other SAN functionality among hosts 110 and storage units 112. The SAN 102 includes a number of switches, such as switches 101, 103 and 104. Switches 101, 103 and 104, for example, may be configured as a set of blade components inserted into a chassis, as rackable or stackable modules, or as other device structures. In one implementation, the chassis has a back plane or mid-plane into which the various blade components, such as switching blades and control processor blades, may be inserted.

Two of the switches, i.e., switches 103 and 104, of the SAN 102 are connected within the LAN 102 via a switch 106. The switch 106 is also used to join other segments of the LAN 100, as represented by the other switches 107 and 108, which are also shown in the LAN 100. In addition, a series of hosts 110 are connected to various switches 104 in the SAN 102. Likewise, storage units, such as described storage units 112, are connected also to various switches 104 in the SAN 102.

Various application clients, such as the workstation 116, are networked to application servers, such as the hosts 114, via the LAN 100. A user can access applications resident on the hosts 114 through the workstation 116. The applications may depend on data (e.g., an email database) stored at one or more of the storage units 112. Accordingly, in the illustrated example, the SAN 102 provides connectivity among the hosts 114, the workstation 116, and the application data storage devices 112 to allow the applications to access the data they need to operate.

The hosts 114 and switches 103 and 104 are configured to communicate using one of a variety of frame formats to allow a Fibre Channel frame to be transported over an Ethernet network, such as LAN 100. In this description, the hosts 114 are also referred to as "FCoE hosts," and the switches 104 and 106 are also referred to as "FCoE switches", as they support communications in compliance with an FCoE protocol. Accordingly, the host, storage device, and switch ports in the FCoE fabric may be designated as FCoE N_PORTs, FCoE F_PORTs, FCoE E_PORTs, and variations thereof. For example, a port of an FCoE host connected through the FCoE fabric may be designated as an FCoE N_PORT, a port of an FCoE switch connected through the FCoE fabric to an FCoE host may be designated an FCoE F_PORT, and a port of an FCoE switch connected to a port of another FCoE switch in the FCoE fabric may be designated as an FCoE E_PORT.

Generally, a developing standard called Fibre Channel over Ethernet (FCoE) allows Fibre Channel (FC) frames to be transmitted and received over an Ethernet network. In one implementation, a standard FC frame is equipped with a specified FCoE header and encapsulated within an Ethernet frame for communication through the Ethernet network. When an FCoE frame is transmitted through the Ethernet network and reaches a properly equipped FCoE switch at the boundary of a SAN, the FCoE switch strips off the Ethernet and FCoE portions of the frame and forwards the previously-embedded FC frame through the SAN. Likewise, when a standard FC frame is transmitted through the SAN and reaches a properly equipped FCoE switch at the boundary of the SAN and an Ethernet network, the FCoE switch adds an FCoE header and an Ethernet header (with appropriate synchronization fields) to the FC frame and forwards the newly-enhanced FCoE frame to the Ethernet network.

The Ethernet header of the FCoE frame includes source and destination L2 addresses, such as MAC addresses, which the Ethernet network uses to communicate the frame to its intended destination. For example, hosts and other devices on the Ethernet network can receive the FCoE frame if they are configured to receive frames having the MAC address in the destination field of the Ethernet header. Typically, each host or other device maintains a list of MAC addresses it is configured to receive. Such MAC addresses may be uni-cast addresses, multi-cast addresses, virtual addresses, etc.

Figure 2:
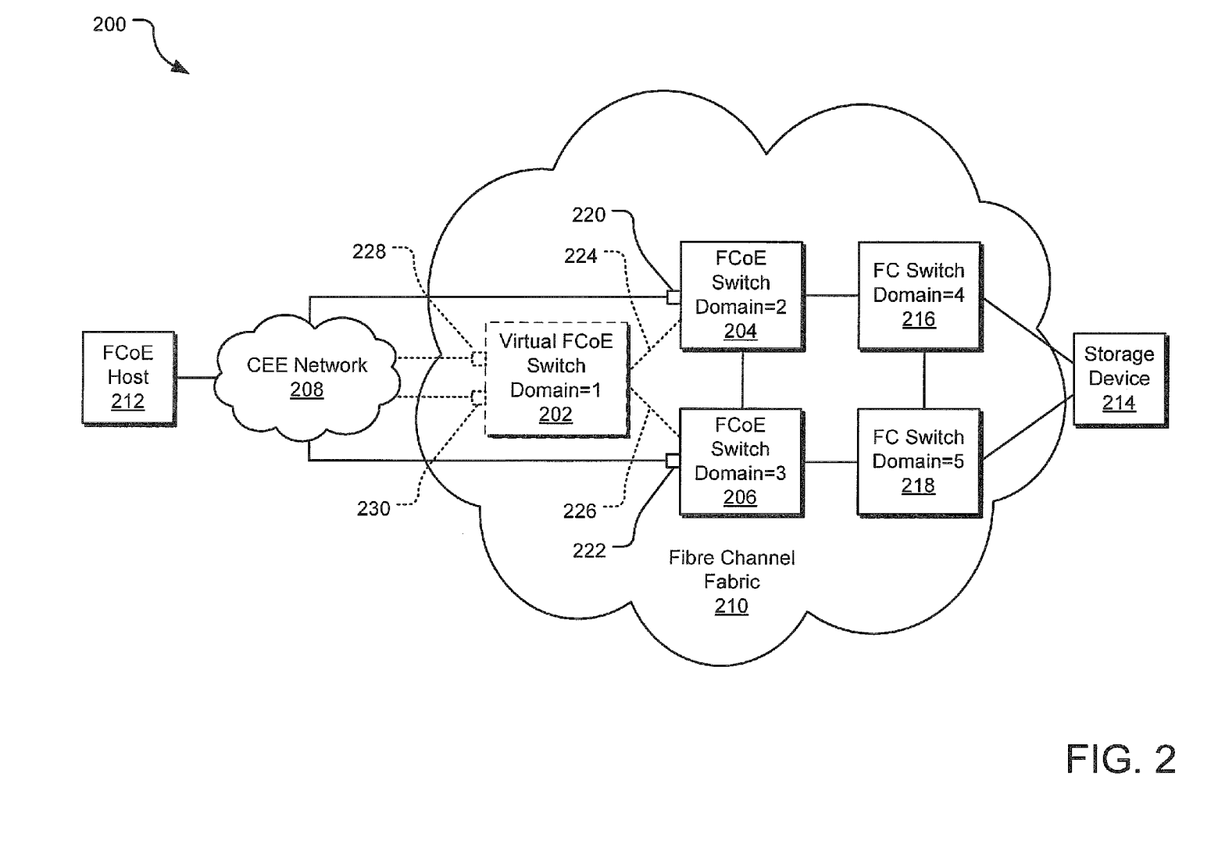
FIG. 2 illustrates an example high availability configuration including a multipath virtual FCoE switch defined between two physical FCoE switches.

FIG. 2 illustrates an example high availability configuration 200 including a multipath virtual FCoE switch 202 defined between two physical FCoE switches 204 and 206. It should be understood that more than two physical FCoE switches may be configured to provide the multipathing described herein, but only two are shown in FIG. 2 for clarity. In FIG. 2, virtual and/or logical switches, ports and links are designated using dashed or dotted lines, whereas physical switches, ports, and links are designated using solid lines.

The physical FCoE switches 204 and 206 provide an interface between an Ethernet network (i.e., CEE network 208) and a Fibre Channel fabric 210. In the illustrated example, the physical FCoE switch 204 is designated as domain 2, and the physical FCoE switch 206 is defined as domain 3. In addition, the Fibre Channel fabric 210 is also illustrated as including a physical FC switch 216 (designated as domain 4) and a physical FC switch 218 (designated as domain 5). Other fabric configurations are also contemplated, and it should be understood that the Fibre Channel fabric 210 may also include other physical FC and FCoE switches (not shown). In the illustrated configuration, an FCoE host 212 can communicate through the Ethernet network 208 and the FC fabric 210 to and from an FC storage target 214.

However, in one fabric configuration (not shown), the N_PORT of the FCoE host 212 would communicate through the Ethernet network 208 to an F_PORT of one of the physical FCoE switches 204 or 206. In light of this single physical path configuration PORT, if the configured F_PORT becomes disabled, communications between the FCoE host 212 and the FC storage target 214 can be interrupted.

In FIG. 2, however, an alternative implementation is shown. The N_PORT of the FCoE host 212 is physically coupled through the Ethernet network 208 to multiple FCoE switch F_PORTs, in this case, F_PORT 220 of the FCoE switch 204 and F_PORT 222 of the FCoE switch 206. The multipath virtual FCoE switch 202 is created between the FCoE switch 204 and the FCoE switch 206, by a switch configuration circuit of one or both of the switches, and designated with a domain identifier (ID) that is unique among the domain IDs of the physical switches in the Fibre Channel fabric 210. In one implementation, the multipath virtual FCoE switch creation is accomplished by a switch configuration circuit of each physical FCoE switch defining a virtual FCoE switch having the same, shared domain ID. For example, in the illustrated example, both physical FCoE switches 204 and 206 define a virtual FCoE switch having a domain ID of "1".

A virtual FCoE switch may be defined as a logical device, implemented in a switch configuration circuit of a physical FCoE switch using software and/or firmware. The switch configuration circuit of the physical FCoE switch assigns a Domain ID to the virtual FCoE switch and adds the virtual FCoE switch to the FCoE fabric like other physical switches, such that data can flow "through" the virtual FCoE switch between two ports defined on the virtual FCoE switch. Accordingly, the virtual FCoE switch is incorporated into the routing configuration within the FCoE fabric. Furthermore, one or more virtual FCoE ports may be defined on both physical and virtual FCoE switches. Each virtual FCoE port is given a unique port address and is incorporated into the routing configuration of the FCoE fabric.

Each physical FCoE switch 204 and 206 defines a virtual FCoE E_PORT for each of its physical Ethernet-connected F_PORTs, and the multipath virtual FCoE switch 202 defines a virtual FCoE E_PORT and a logical Inter Switch Link (ISL) for each Ethernet-connected F_PORT of each physical FCoE switch 204 and 206 (see logical ISLs 224 and 226). The logical ISLs create logical Fabric Shortest Path First (FSPF) adjacencies between the virtual FCoE switch 202 and multipath virtual FCoE E_PORTs of the physical FCoE switches 204 and 206, thereby advertising the reachability of the multipath virtual FCoE switch 202 through the two physical FCoE switches 204 and 206 in the Fibre Channel fabric 210.

For example, two FCoE switches may be considered "logically adjacent" after their topology databases are synchronized. After an FCoE switch (e.g., one of the physical FCoE switches) detects that one of its ports is connected to another switch (e.g. the multipath virtual FCoE switch), it starts exchanging messages with the other FCoE switch, so that both FCoE switches learn the Domain ID and connected Port ID of the other FCoE switch. The newly connected ISL is added to the respective topology databases of the two FCoE switches, and the FCoE switches exchange topology database information (whether entirely or differentially) to effect the full database synchronization. Furthermore, the FCoE switches issue messages regarding the existence of the newly created logical ISL to other switches in the fabric, thereby allowing the rest of the fabric to learn of the adjacency.

Further, the multipath virtual FCoE switch 202 also defines a virtual FCoE F_PORT for each physical Ethernet-connected F_PORTs of the physical FCoE switches 204 and 206 that it services. As such, the multipath virtual FCoE switch 202 has defined two virtual FCoE F_PORTs 228 and 230 for communication with the CEE network 208 in the illustrated example.

In one implementation, as specified by an FCoE protocol, the FCoE hosts encapsulate FC frames in FCoE frames for communication to a physical FCoE switch in the primary FCoE path. The physical FCoE switch removes the Ethernet and FCoE layers from the received FCoE frame and forwards the resulting FC frame to its intended destination. In the reverse direction, the physical FCoE switch receives FC frames for communication to an FCoE host and encapsulates such frames in FCoE and Ethernet layers for communication through the CEE network. Implementation variations may exist, pending approval of different version of the FCoE protocol standard.

In summary, the illustrated example of a high availability configuration includes multiple physical communications links between a CEE network and physical FCoE switches to provide multiple path options into the FC fabric. These multipathing physical FCoE switches define a shared, multipath virtual FCoE switch having its own domain ID. Toward the FC fabric, the multipath virtual FCoE switch defines a virtual FCoE E_PORT and a logical ISL for each physical F_PORT of each physical FCoE switch interfacing with the CEE network. Each logical ISL "connects" to a virtual FCoE E_PORT defined on each physical FCoE switch. Toward the CEE network, the multipath virtual FCoE switch defines a virtual FCoE F_PORT for each physical F_PORT of each physical FCoE switch interfacing with the CEE network. A communications through one of the physical FCoE F_PORTs and switches is defined as the primary communications paths while other physical FCoE F_PORTs and switches are held in reserve (e.g., as parts of standby paths) in case the primary FCoE path is disabled.

Figure 3:
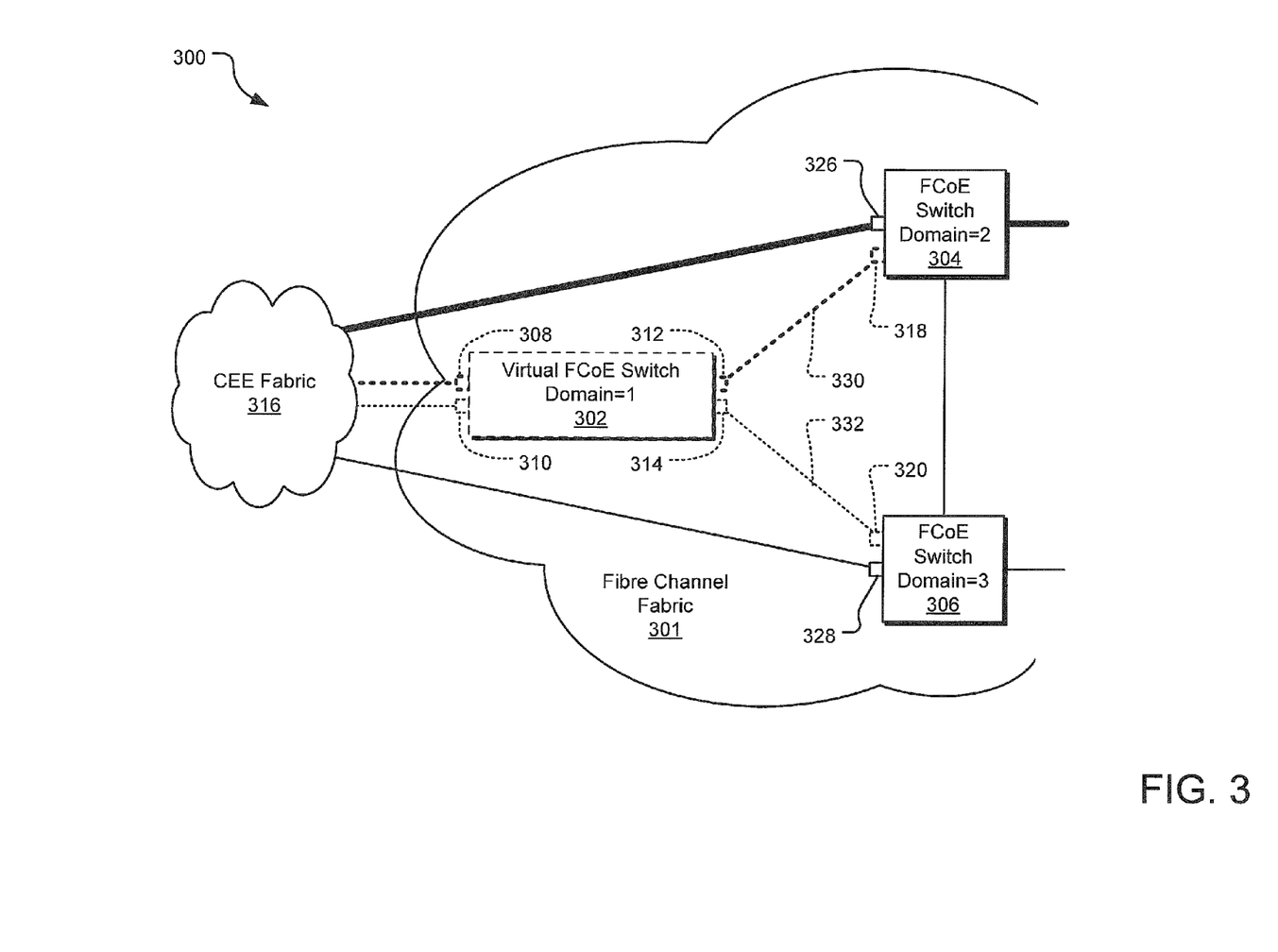
FIG. 3 illustrates an example high availability configuration including a multipath virtual FCoE switch defined between two physical FCoE switches and showing ownership of a MAC address of a virtual FCoE F_PORT.

FIG. 3 illustrates an example high availability configuration 300 including a multipath virtual FCoE switch 302 defined between two physical FCoE switches 304 and 306 and showing ownership of a MAC address of a virtual FCoE F_PORT 308. In FIG. 3, virtual and/or logical switches, ports and links are designated using dashed or dotted lines, whereas physical switches, ports, and links are designated using solid lines. In the illustrated example, the physical FCoE switch 304 is designated as domain 2, and the physical FCoE switch 306 is defined as domain 3. Furthermore, the multipath virtual FCoE switch 302 is assigned a domain ID equaling 1.

Each of the physical FCoE switches 304 and 306 represents a switch in a Fibre Channel fabric 301 and possesses a physical FCoE F_PORT (see 326 and 328) connected to a CEE network 316. Each physical FCoE switch has also defined a virtual FCoE E_PORT (see 318 and 320).

The multipath virtual FCoE switch 302 has defined with two virtual FCoE E_PORTs 308 and 310 and two virtual FCoE F_PORTs 312 and 314, each virtual E_PORT/F_PORT pair corresponding with a physical FCoE F_PORT of a physical FCoE switch that is connected to a CEE network 316. A logical ISL (see 330 and 332) is defined between each virtual FCoE E_PORT of the multipath virtual FCoE switch 302 and its corresponding virtual FCoE E_PORT of one of the physical FCoE switches.

Each virtual FCoE F_PORT on the multipath virtual FCoE switch 302 is assigned a shared MAC address. At any point, the physical FCoE F_PORT of the physical FCoE switch in the primary FCoE path "owns" ("is associated with") the shared MAC address of the corresponding virtual FCoE F_PORT of the multipath virtual FCoE switch 302. In the illustrated example, the primary (active) path is designated through the physical FCoE F_PORT 326 of the physical FCoE switch 304, as designated by the bolder signal lines (i.e., solid bold lines for the primary physical path and dashed or dotted bold lines for the primary logical path). Therefore, physical FCoE F_PORT 326 owns the shared MAC address of the virtual FCoE F_PORT 308 of the multipath virtual FCoE switch 302. As such, the CEE network 316 forwards communications to the physical FCoE F_PORT that owns the shared MAC address (e.g., the shared MAC address is a destination address for the frames being sent from the CEE network 316). Likewise, communications from the physical FCoE F_PORTs use the shared MAC address as the source address of frames injected into the CEE network 316.

The physical FCoE F_PORT 328 of the physical FCoE switch 306 waits in a standby condition and does not own the shared MAC address (which is also termed a "virtual MAC address"). However, if the primary FCoE path through the physical FCoE F_PORT 326 of the physical FCoE switch 304 fails, the physical FCoE F_PORT 328 of the physical FCoE switch 306 will take ownership of the shared MAC address to enable frames from the CEE network 316 to be forwarded along the new primary FCoE path through the physical FCoE F_PORT 328 of the physical FCoE switch 306.

Figure 4:
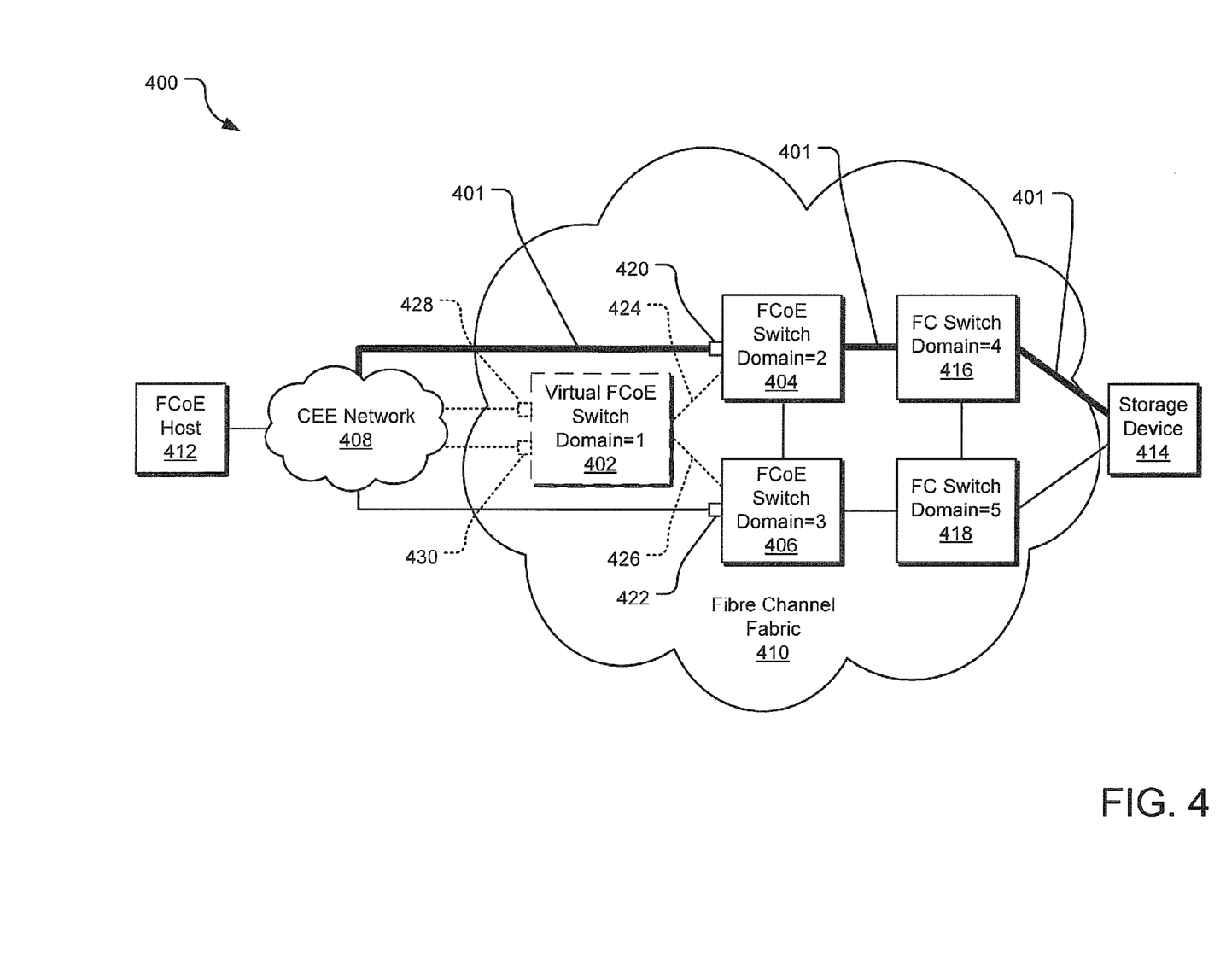
FIG. 4 illustrates an example high availability configuration with communications through a primary physical FCoE path.

FIG. 4 illustrates an example high availability configuration 400 with communications through a primary physical FCoE path 401. In FIG. 4, virtual and/or logical switches, ports and links are designated using dashed or dotted lines, whereas physical switches, ports, and links are designated using solid lines.

The physical FCoE switches 404 and 406 provide an interface between an Ethernet network (i.e., CEE network 408) and a Fibre Channel fabric 410. In the illustrated example, the physical FCoE switch 404 is designated as domain 2, and the physical FCoE switch 406 is defined as domain 3. In addition, the Fibre Channel fabric 410 is also illustrated as including a physical FC switch 416 (designated as domain 4) and a physical FC switch 418 (designated as domain 5). Other fabric configurations are also contemplated, and it should be understood that the Fibre Channel fabric 410 may also include other FC and FCoE switches (not shown). In the illustrated configuration, an FCoE host 412 can communicate through the Ethernet network 408 and the FC fabric 410 to and from an FC storage target 414.

The N_PORT of the FCoE host 412 is physically coupled through the Ethernet network 408 to multiple FCoE switch F_PORTs, in this case, F_PORT 420 of the FCoE switch 404 and F_PORT 422 of the FCoE switch 406. A multipath virtual FCoE switch 402 is created between the FCoE switch 404 and the FCoE switch 406 and designated with a domain ID that is unique among the domain IDs of the physical switches in the Fibre Channel fabric 410.

In addition, each physical FCoE switch 404 and 406 defines a virtual FCoE E_PORT for each of its Ethernet-connected F_PORTs, and the multipath virtual FCoE switch 402 defines a virtual FCoE E_PORT and a logical Inter Switch Link (ISL) for each Ethernet-connected F_PORT of each physical FCoE switch 404 and 406 (see logical ISLs 424 and 426). Further, the multipath virtual FCoE switch 402 also defines a virtual FCoE F_PORT for each physical Ethernet-connected F_PORTs of the physical FCoE switches 404 and 406 that it services. As such, the multipath virtual FCoE switch 402 has defined two virtual FCoE F_PORTs for communication with the CEE network 408 in the illustrated example.

When the FCOE host 412 initially sends an FLOGI request into the Fibre Channel fabric 410, only one of the physical FCoE switches will respond, i.e., the physical FCoE switch 404 in this case. By allocating a virtual FC ID from the multipath virtual FCoE switch's domain (i.e., 1), responding using the shared MAC address as the source MAC address of the FLOGI ACC, and tying ownership of the virtual MAC address to the physical FCoE F_PORT 420 using the XF Port assignment process, the physical FCoE switch 404 configures itself as the primary FCoE path (as indicated by the bold lines). All subsequent FCoE traffic from the N_PORTs of the FCoE host 412 and other FCoE hosts in the CEE network 408 (not shown) is directed to the virtual MAC with the virtual FC ID as the source address. Such N_PORTs discover the targets, perform PLOGI exchanges, and initiate 10 using normal FCoE protocols and processes. The destination FC IDs are not virtualized.

The primary FCoE path operates in the reverse direction as well. Traffic sourced from the FC fabric 410 for delivery into the CEE network 408 is destined for the domain ID of the multipath virtual FCoE switch 402 (i.e., domain ID=1). As domain ID 1 is advertised as being adjacent to both domain ID 2 and domain ID 3, such traffic is routed to one of those two domains. In one implementation, to ensure that such traffic is only routed to one of those two domains at any one time, the domain in the primary FCoE path is assigned a lower path cost than any domains in standby paths.

Figure 5:
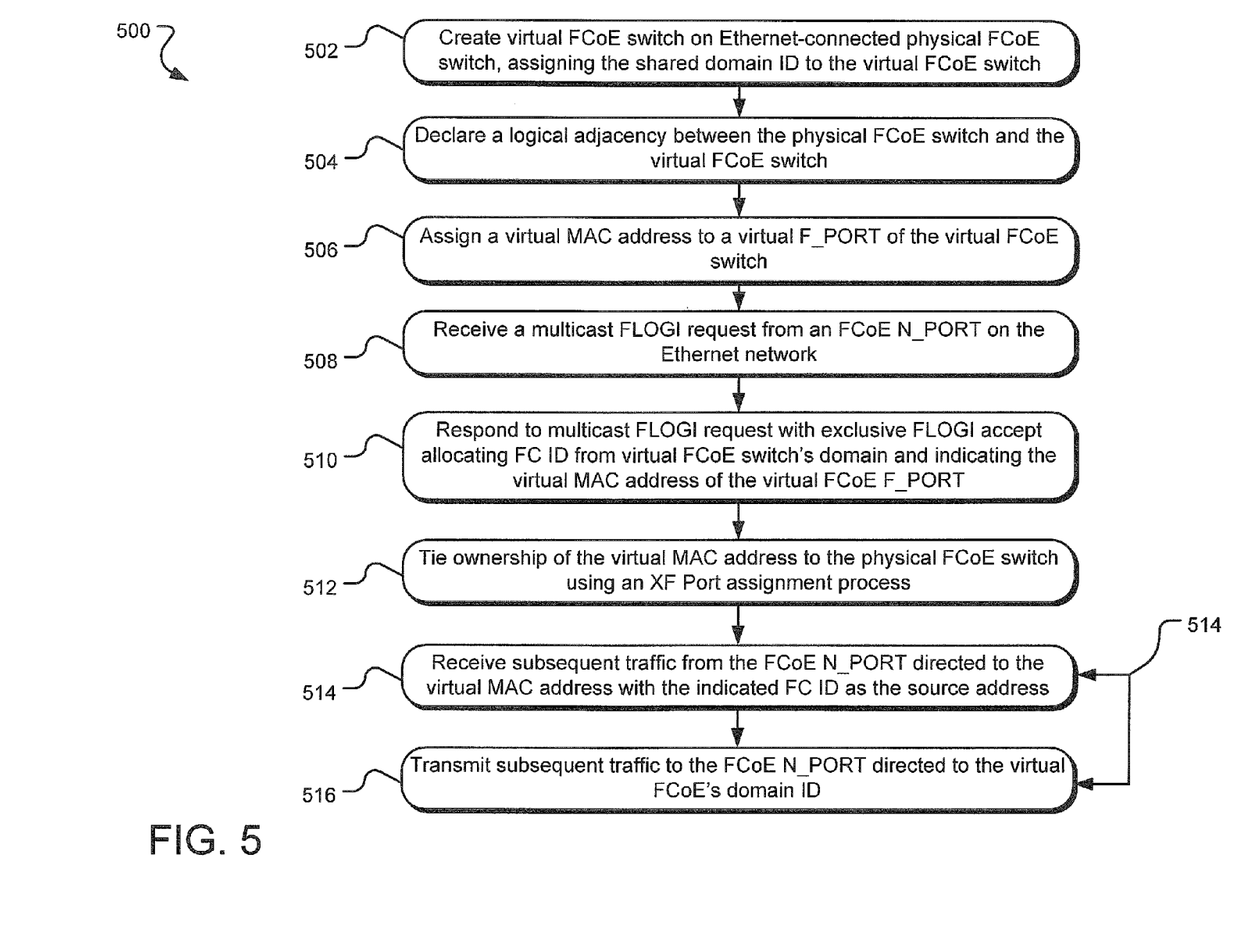
FIG. 5 illustrates example operations for setting up a high availability configuration with communications through a primary physical FCoE path.

FIG. 5 illustrates example operations 500 for setting up a high availability configuration with communications through a primary physical FCoE path. A creation operation 502 defines a multipath virtual FCoE switch using an Ethernet-connected physical FCoE switch. The creation operation 502 also assigns a shared domain ID to the virtual FCoE switch. One or more other Ethernet-connected physical FCoE switches also define a virtual FCoE switch, assigning the same shared domain ID. As a result of the multiple virtual FCoE switch definitions, a plurality of Ethernet-connected physical FCoE switches create a shared, multipath virtual FCoE switch among them to participate in the multipathing of the high availability configuration.

A declaration operation 504 declares a logical adjacency between the physical FCoE switch and the multipath virtual FCoE switch. Other physical FCoE switches sharing the multipath virtual FCoE switch also declare logical adjacency with the shared, multipath virtual FCoE switch. An assignment operation 506 assigns a multipath virtual MAC address to a virtual F_PORT of the multipath virtual FCoE switch. Other physical FCoE switches sharing the multipath virtual FCoE switch also assign the virtual MAC address to a virtual F_PORT of the multipath virtual FCoE switch so that the virtual FCoE ports of the multipath virtual FCoE switch share the same virtual MAC address.

A login operation 508 receives a multicast FLOGI request from an FCoE N_PORT on a connected Ethernet network (e.g., from an FCoE host). In one implementation, the FCoE N_PORT performs a standard fabric login process—the physical FCoE switches coupled to the CEE network and receiving the login create the multipathing configuration in response to the login. A login response operation 510 responds to the FLOGI request with an exclusive FLOGI ACC (i.e., only one physical FCoE switch responds to the FLOGI request). Via the FLOGI ACC response, the responding physical FCoE switch allocates a virtual FC ID from the multipath virtual FCoE switch's domain and indicates the virtual MAC address of the virtual FCoE F_PORT. In a tying operation 512, the responding physical FCoE switch also takes ownership of the virtual MAC address (e.g., via an XF Port assignment process). As such, the Ethernet network learns of the presence of the virtual FCoE F_PORT on the responding physical FCoE switch. In this manner, the primary FCoE path is configured through the responding physical FCoE switch.

A receiving operation 514 and a transmitting operation 516 can operate and repeat in any order, as indicated by the bidirectional arrow 518. The receiving operation 514 receives FCoE frame traffic from the FCoE N_PORT of an FCoE source device through the Ethernet network. The traffic is directed to the virtual MAC address, which is recorded in a field of the encapsulating Ethernet and FCoE layers and currently owned by the responding FCoE switch, and includes the virtual FC ID as the source address of the encapsulated FC frame.

The responding FCoE switch extracts the FC frame from the FCoE encapsulation and performs normal FC forwarding. For example, a received (de-encapsulated) FC frame is examined to learn the Domain ID and Area ID of the FC ID in the source FC address field. Domain/Area routing is performed to the physical FC ID in the FC fabric.

The transmitting operation 516 operates in the opposite direction as the receiving operation 514. FC frame traffic in this operation is destined to the multipath virtual FCoE switch's domain ID, which is advertised as being reachable via one or more of the physical FCoE switches that share the multipath virtual FCoE switch. In one implementation, the path cost of the physical FCoE switch in the primary FCoE path is set as less than the path cost of other physical FCoE switches sharing the multipath virtual FCoE switch in order to ensure that only the physical FCoE switch in the primary FCoE path receives the frame traffic destined for the Ethernet network. The physical FCoE switch in the primary FCoE path encapsulates the FC frames in Ethernet and FCoE layers and transmits the resulting FCoE frame to the Ethernet network through its physical FCoE F_PORT for delivery to the FCoE N_PORT for which it is destined.

Figure 6:
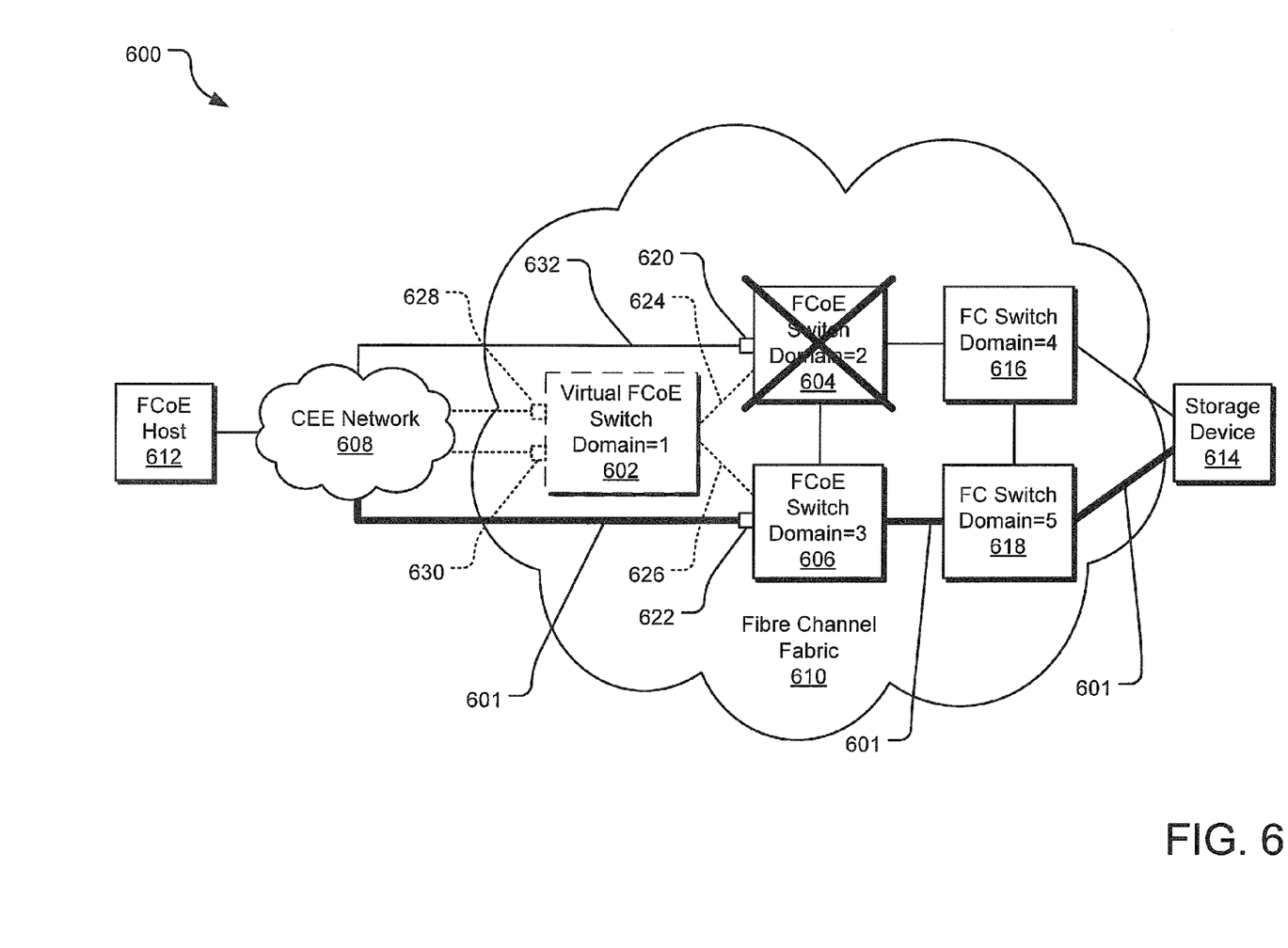
FIG. 6 illustrates an example high availability configuration including a multipath virtual FCoE switch defined by two physical FCoE switches, after a path switchover.

FIG. 6 illustrates an example high availability configuration including a virtual FCoE switch defined by two physical FCoE switches, after a path switchover. In FIG. 6, virtual and/or logical switches, ports and links are designated using dashed or dotted lines, whereas physical switches, ports, and links are designated using solid lines.

The physical FCoE switches 604 and 606 provide an interface between an Ethernet network (i.e., CEE network 608) and a Fibre Channel fabric 610. In the illustrated example, the physical FCoE switch 604 is designated as domain 2, and the physical FCoE switch 606 is defined as domain 3. In addition, the Fibre Channel fabric 610 is also illustrated as including a physical FC switch 616 (designated as domain 4) and a physical FC switch 618 (designated as domain 5). Other fabric configurations are also contemplated, and it should be understood that the Fibre Channel fabric 610 may also include other FC and FCoE switches (not shown). In the illustrated configuration, an FCoE host 612 can communicate through the Ethernet network 608 and the FC fabric 610 to and from an FC storage target 614.

The N_PORT of the FCoE host 612 is physically coupled through the Ethernet network 608 to multiple FCoE switch F_PORTs, in this case, F_PORT 620 of the FCoE switch 604 and F_PORT 622 of the FCoE switch 606. A multipath virtual FCoE switch 602 is created between the FCoE switch 604 and the FCoE switch 606 and designated with a domain ID that is unique among the domain IDs of the physical switches in the Fibre Channel fabric 610.

In addition, each physical FCoE switch 604 and 606 defines a virtual FCoE E_PORT for each of its Ethernet-connected F_PORTs, and the multipath virtual FCoE switch 602 defines a virtual FCoE E_PORT and a logical Inter Switch Link for each Ethernet-connected F_PORT of each physical FCoE switch 604 and 606 (see logical ISLs 624 and 626). Further, the multipath virtual FCoE switch 602 also defines a virtual FCoE F_PORT for each physical Ethernet-connected F_PORTs of the physical FCoE switches 604 and 606 that it services. As such, the multipath virtual FCoE switch 602 has defined two virtual FCoE F_PORTs for communication with the CEE network 608 in the illustrated example.

In FIG. 6, some aspect of communications through primary FCoE path fails (e.g., the physical FCoE switch 604, the Ethernet-connected F_PORT 620, or the physical link 632 connected to the F_PORT 620). Detection of such a failure invokes a switchover of the primary FCoE path to one of the standby paths. If the physical FCoE switch 604 fails, the failure can be detected by other FC/FCoE switches in the FC fabric 610 upon receipt and processing of a domain OFFLINE RSCN, which will result in the updating of domain routing tables to route along a newly-designated primary FCoE path (designated by the bold line 601).

In other circumstances, the entire physical FCoE switch 604 may not fail. Instead, only the physical FCoE F_PORT 620 of the physical FCoE switch 604 may fail or the link 632 may fail. In such circumstances, path re-direction at the port and/or address level may be effected to force FSPF path re-routing.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of configuring one or more available Fibre Channel over Ethernet (FCoE) paths in an FCoE fabric, the method comprising:

defining a virtual FCoE switch connected to both a first physical FCoE switch and a second physical FCoE switch, wherein a virtual MAC address of a virtual FCoE F_PORT defined on the virtual FCoE switch is associated with a physical FCoE F_PORT of the first physical FCoE switch and not with a physical FCoE F_PORT of the second physical FCoE switch; and declaring logical adjacency between the first physical FCoE switch and the virtual FCoE switch.

2. The method of claim 1 wherein the operation of defining a virtual FCoE switch comprises:

defining a virtual FCoE switch by the first physical FCoE switch, the virtual FCoE switch sharing a domain identifier with a virtual FCoE switch defined by the second physical FCoE switch in the FCoE fabric, the virtual FCoE switches combining to define the multipath virtual FCoE switch.

3. The method of claim 1 further comprising:

defining the virtual FCoE F_PORT on the virtual FCoE switch;

assigning the virtual MAC address to the virtual FCoE F_PORT of the virtual FCoE switch; and associating the virtual MAC address to the physical FCoE F_PORT of the first physical FCoE switch, wherein the virtual MAC address is not associated with the physical FCoE F_PORT of the second physical FCoE switch.

4. The method of claim 1 further comprising:

defining a virtual FCoE E_PORT on the virtual FCoE switch for each of the first and second physical FCoE switches;

defining a virtual FCoE E_PORT on the first physical FCoE switch; and defining a logical Inter Switch Link (ISL) between one of the virtual FCoE E_PORTs on the virtual FCoE switch and the virtual FCoE E_PORT on the first physical FCoE switch.

5. The method of claim 1 further comprising:

assigning the virtual MAC address to a virtual FCoE F_PORT defined on the virtual FCoE switch;

tying ownership of the virtual MAC address of the virtual FCoE F_PORT to the physical FCoE F_PORT of the first physical FCoE switch; and responding to a Fabric Login (FLOGI) using the virtual MAC address of the virtual FCoE F_PORT defined on the virtual FCoE switch.

6. The method of claim 1 further comprising:

adjusting a relative path cost between the first physical FCoE switch and the second physical FCoE switch to route FCoE traffic through the first physical FCoE switch and to bypass the second physical FCoE switch.

7. A physical FCoE switch comprising:
a physical FCoE F_PORT configured to couple through an Ethernet portion of the FCoE fabric to a physical FCoE N_PORT of an FCoE node through an FCoE fabric;
a switch configuration circuit coupled to the physical FCoE F PORT, the switch configuration circuit defining a virtual FCoE switch between the physical FCoE switch and the FCoE N_PORT of the FCoE node, wherein a virtual MAC address of a virtual FCoE F_PORT defined on the virtual FCoE switch is associated with the physical FCoE F_PORT of the physical FCoE switch and a logical adjacency is declared between the physical FCoE switch and the virtual FCoE switch.

8. The physical FCoE switch of claim 7 wherein the virtual MAC address of a virtual FCoE F_PORT is shared by the first physical FCoE switch and a second physical FCoE switch.

9. The physical FCoE switch of claim 7 wherein the virtual FCoE switch is defined using a virtual FCoE switch defined by the physical FCoE switch, the virtual FCoE switch sharing a domain identifier with a virtual FCoE switch defined by another physical FCoE switch in the FCoE fabric, the virtual FCoE switches combining to define a multipath virtual FCoE switch.

10. The physical FCoE switch of claim 7 wherein the virtual FCoE switch is logically connected to the physical FCoE switch and another physical FCoE switch, and the virtual MAC address is not associated to a physical FCoE F_PORT of the other physical FCoE switch.

11. The physical FCoE switch of claim 7 further comprising:
a virtual FCoE E_PORT defined on the virtual FCoE switch for each of the physical FCoE switch and another physical FCoE switch, wherein the virtual FCoE switch is logically connected to both the physical FCoE switch and the other physical FCoE switch;
a virtual FCoE E_PORT defined on the physical FCoE switch; and
a logical Inter Switch Link (ISL) defined between one of the virtual FCoE E PORTs on the virtual FCoE switch and the virtual FCoE E_PORT on the physical FCoE switch.

12. The physical FCoE switch of claim 7 wherein ownership of the virtual MAC address of the virtual FCoE F_PORT is tied to the physical FCoE F_PORT of the physical FCoE switch.

13. The physical FCoE switch of claim 7 wherein the physical FCoE switch responds to a Fabric Login (FLOGI) using the virtual MAC address of the virtual FCoE F_PORT defined on the virtual FCoE switch.

14. The physical FCoE switch of claim 7 wherein a multipath virtual FCoE switch is defined by a virtual FCoE switch of the physical FCoE switch and a virtual FCoE switch of another physical FCoE switch, and a relative path cost between the physical FCoE switch and the other physical FCoE switch is adjusted to route FCoE traffic through physical FCoE switch and to bypass the other physical FCoE switch.

15. A Fibre Channel over Ethernet (FCoE) fabric, the FCoE fabric comprising:
a first physical FCoE switch coupled through an Ethernet portion of the FCoE fabric to a physical FCoE N_PORT of an FCoE node;
a second physical FCoE switch coupled through the Ethernet portion of the FCoE fabric to the physical FCoE N_PORT of the FCoE node; and
a virtual FCoE switch defined by the first and second physical FCoE switches, wherein a logical adjacency is declared between the first physical FCoE switch and the virtual FCoE switch and a virtual MAC address of a virtual FCoE F_PORT defined on the virtual FCoE switch is associated with a physical FCoE F_PORT of the first physical FCoE switch.

16. The FCoE fabric of claim 15 wherein, if the physical FCoE F_PORT of the first physical FCoE switch fails, the virtual MAC address of a virtual FCoE F_PORT is associated with a physical FCoE F_PORT of the second physical FCoE switch.

17. The FCoE fabric of claim 15 further comprising:
virtual FCoE E_PORTs defined on the virtual FCoE switch for each of the first and second physical FCoE switches;
a virtual FCoE E_PORT defined on each of the first and second physical FCoE switches;
a first logical Inter Switch Link (ISL) defined between one of the virtual FCoE E_PORTs on the virtual FCoE switch and the virtual FCoE E_PORT of the first physical FCoE switch; and
a second logical ISL defined between a different one of the virtual FCoE E_PORTs on the virtual FCoE switch and the virtual FCoE E_PORT of the second physical FCoE switch.

18. The FCoE fabric of claim 15 wherein ownership of the virtual MAC address of the virtual FCoE F_PORT is tied to the physical FCoE F_PORT of the first physical FCoE switch.

19. The FCoE fabric of claim 15 wherein the first physical FCoE switch responds to a Fabric Login (FLOGI) using the virtual MAC address of the virtual FCoE F_PORT defined on the virtual FCoE switch; and
if a primary FCoE path through the physical FCoE F_PORT of the first physical FCoE switch fails, the second physical FCoE switch responds to the Fabric Login (FLOGI) using the virtual MAC address of the virtual FCoE F_PORT defined on the virtual FCoE switch.

20. The FCoE fabric of claim 15 wherein a multipath virtual FCoE switch is defined by a virtual FCoE switch of the first physical FCoE switch and a virtual FCoE switch of the second physical FCoE switch, and a relative path cost between the first physical FCoE switch and the second physical FCoE switch is adjusted to route FCoE traffic through the first physical FCoE switch and to bypass the second physical FCoE switch.

* * * * *